Oct. 3, 1967

L. E. SIMPSON ETAL 3,344,704

ILLUMINATION CONTROL

Filed Sept. 24, 1964

LEWIS E. SIMPSON
WILLIAM E. KAROW
INVENTORS

BY Leon D. Rosen
Albert Rosen

ATTORNEYS

LEWIS E. SIMPSON
WILLIAM E. KAROW
INVENTORS

United States Patent Office 3,344,704
Patented Oct. 3, 1967

3,344,704
ILLUMINATION CONTROL
Lewis Edward Simpson, 255 W. 234th St., Wilmington, Calif. 90744, and William Eugene Karow, 7367 W. 93rd Place, Los Angeles, Calif. 90045
Filed Sept. 24, 1964, Ser. No. 398,992
9 Claims. (Cl. 88—24)

ABSTRACT OF THE DISCLOSURE

An illumination control for a photocopy camera to increase exposure time as line voltage to the lamp decreases and vice versa, comprising a capacitor charged by the line voltage, the capacitor connected through a unijunction transistor to a relay. When the capacitor voltage reaches a predetermined level, the unijunction transistor allows it to discharge through the relay and thereby terminate the exposed period.

This invention relates to illumination control means for controlling the illumination provided by a light source; while not limited thereto, the invention is described by way of example as applied to a photocopy camera exposure control circuit which varies exposure time of an integral light source in accordance with variations in the supplied voltage, thus rendering the camera substantially immune to instantaneous light-supply voltage changes.

Photo-copying equipment often comprises a light source for illuminating documents to be copied and a camera for producing an image of the document on light sensitive material such as microfilm. The light sensitive medium is usually exposed for a predetermined period of time so that the total illumination provides sufficient reproduction density and yet not so much as to cause overexposure. If the intensity of illumination varies during the exposure of a document, the reproduction may be over or under exposed.

The light source for illuminating the document is generally an electric lamp energized by power lines which lead from a distant generating plant. Often the voltage across the power lines varies as more power is drawn or added by other power consumers in the same network. Frequently, the variations take the form of sudden decreases or surges in voltage. For example, if small conductors carry power from the power network to a particular establishment, the energizing of a large electric motor, or the reversal of the motor, will cause large and sudden voltage decreases or surges, respectively, in the power outlets located in the establishment. The intensity of illumination provided by an incandescent lamp or other comparable light source is dependent upon its supply voltage, the light intensity generally being proportional to the fourth power of the lamp filament temperature. Thus, if the voltage is not equal to that for which the timing period was set, or for example, if sudden increases or decreases in voltage occur during the period of exposure, however brief, the total illumination, or integral of incident light, is likely to be substantially different from the optimum.

A means for rapidly and automatically adjusting the exposure time to compensate for power-line induced light level changes would thus be of great utility in assuring good reproduction. Such a means should be responsive to rapid voltage variations during the exposure period, should vary the exposure period according to the change in light intensity caused by voltage change even where the relationship between voltage and light intensity is not proportional, and should be relatively simple and reliable. The present invention provides such a means and also provides an overall efficient illumination control.

Accordingly, one object of the present invention is to provide an improved control for an electrically energized illuminating source, which varies the period of effective exposure as the energy supplied to the illuminating source varies.

Another object is to provide an improved control for varying the period of exposure employed in operating reproduction equipment, according to the voltage supplied to an electrically energized illuminating source, which is sensitive to relatively rapid and unpredictable voltage changes during the exposure period.

Another object is to provide an improved illumination control means for photo-reproduction equipment, which is characterized in simplicity of operation, and in economy and reliability.

The foregoing and other objects are realized in one embodiment of the invention, by an illumination control which employs a charging device such as a capacitor. The capacitor is charged through a resistor at a rate dependent upon the resistance value and the power source or "line" voltage, as by connecting the capacitor-resistor network across a direct-current voltage line whose voltage is proportional to the same power line voltage supplied to an electric lamp or other illumination source. The capacitor-resistor network is connected across a switching device, such as a unijunction transistor, which becomes conducting when a predetermined voltage is attained. When the capacitor attains the switching voltage it suddenly discharges, and the discharging current terminates the timing period, as by closing a camera shutter, extinguishing a lamp, or otherwise controlling the exposure of an illumination control means. The circuit is constructed so that the switching voltage is substantially independent of the supply voltage, as by providing a zener diode across the bases of the unijunction transistor, the voltage across the bases determining the predetermined switching voltage.

When the power line voltage increases, the capacitor or other charging device charges more rapidly and the switching voltage is attained in a shorter, usually disproportionately shorter, period of time. Thus, the illumination period is reduced when power line voltage increases, and vice versa.

The effect of a given power line voltage change, on the illumination period controlled by a capacitor charging device, can be altered by changing the capacitance and the required switching voltage, in order to account for the usually more-than-proportional light intensity change caused by line voltage variations. If the capacitor and its charging circuit are constructed so that the switching voltage occurs near the final voltage toward which the capacitor is being charged, then a slight change in power line voltage will cause a much-larger-than-proportional change in the illumination period. If the switching voltage is much less than the voltage toward which the capacitor is being charged, a change in line voltage causes a closer-to-proportional change in illumination period. The size of the timing capacitor and related circuit components can be altered to vary the relationship between power line voltage variation and the variation in the timed illumination period.

In one preferred embodiment of the invention, where a camera shutter is employed to regulate exposure time, the illuminating lamps are connected to the timing circuit so that they are fully energized only while the shutter is opened, thereby reducing the consumed power and the heat generated by the lamps, and also extending their operating lives.

The novel features that are considered characteristic of this invention are set forth with particularity in the appended claims. The invention itself, both as to its organization and method of operation as well as to additional objects and advantages thereof, will best be understood from the following description when read in connection with the accompanying drawings, in which:

Figure 3:
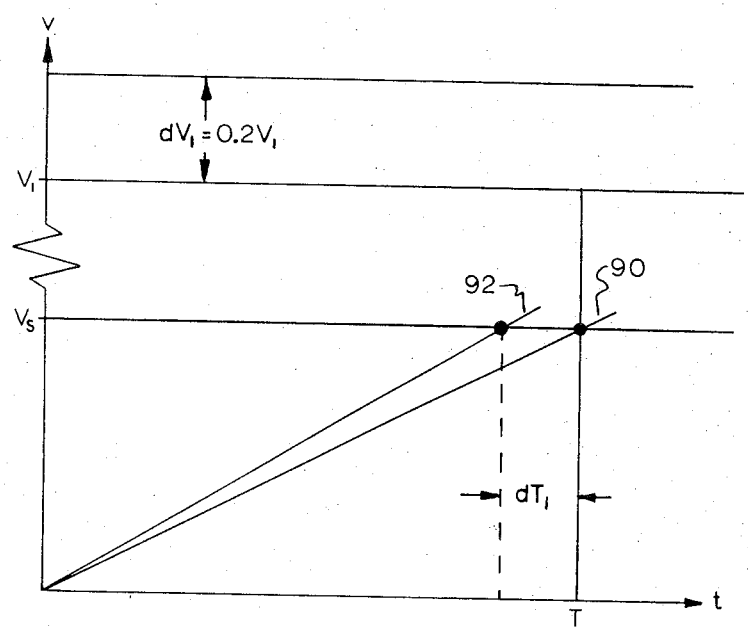
Figure 4:
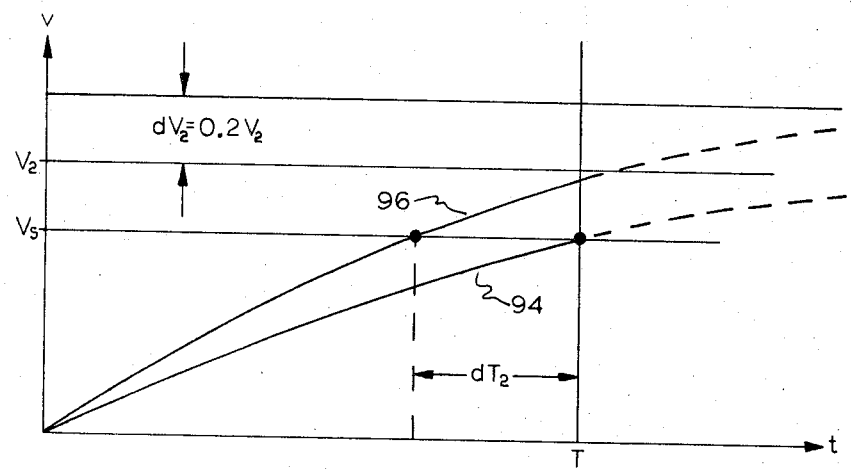

FIG. 3 is a graph of the voltage across a timing capacitor used in an embodiment of the invention in a circuit employing a charging voltage appreciably higher than the switching voltage at which the capacitor discharges; and FIG. 4 is a graph of voltage across a timing capacitor in an embodiment of the invention, and wherein the capacitor charging voltage is only slightly greater than the switching voltage.

Figure 1:
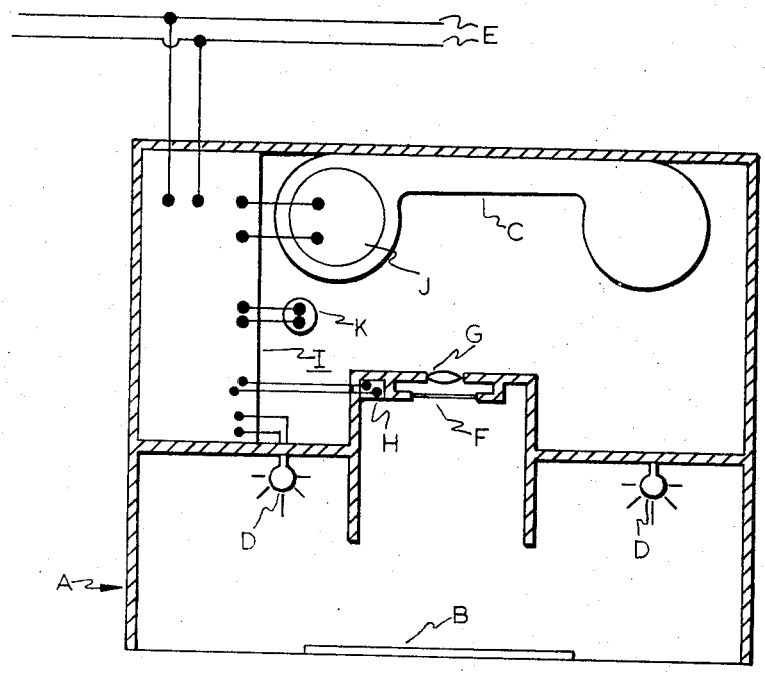
FIG. 1 is a representation of a photocopy camera having an integral light source, and which utilizes an illumination control constructed in accordance with the present invention.

Reference is now made to FIG. 1, which illustrates a photocopy apparatus A used to copy a document B on a frame of a strip of film C. The document is illuminated by incandescent lamps D which are energized by a voltage proportional to that from a power line E. Light incident on the document B passes through a shutter F and a lens G which focuses an image of the document on the selected frame of the film strip C. Such a photocopy camera is described in greater detail, for example, in a patent application Serial No. 390,035, of Karow et al., assigned to the same assignee as that of the present invention.

The shuter F is moved by a solenoid H which is energized by current from a timing device I. The timing device I is connected to the power line E and holds the shutter F open for a period of time which is a function of the voltages across the power line during the exposure period.

In the operation of the photocopy apparatus A, a reproduction of the document B is obtained by first energizing the electric lamps D. The lamps D are energized with line voltage or a voltage which is proportional to a voltage through the timing device I. The exposure of the film C occurs when current from the timing device I is delivered to the solenoid H to open the shutter F. An exposure counter K is also energized to advance the indication of the number of frames exposed. After a period of time, which is dependent upon the voltage across the power line E, the flow of current to the solenoid H is terminated and the shutter F closes. The timing device then delivers current to a motor J which winds the film strip C until a new frame thereof is positioned behind the lens G, and the photocopy apparatus has been reset for a new exposure.

Figure 2:
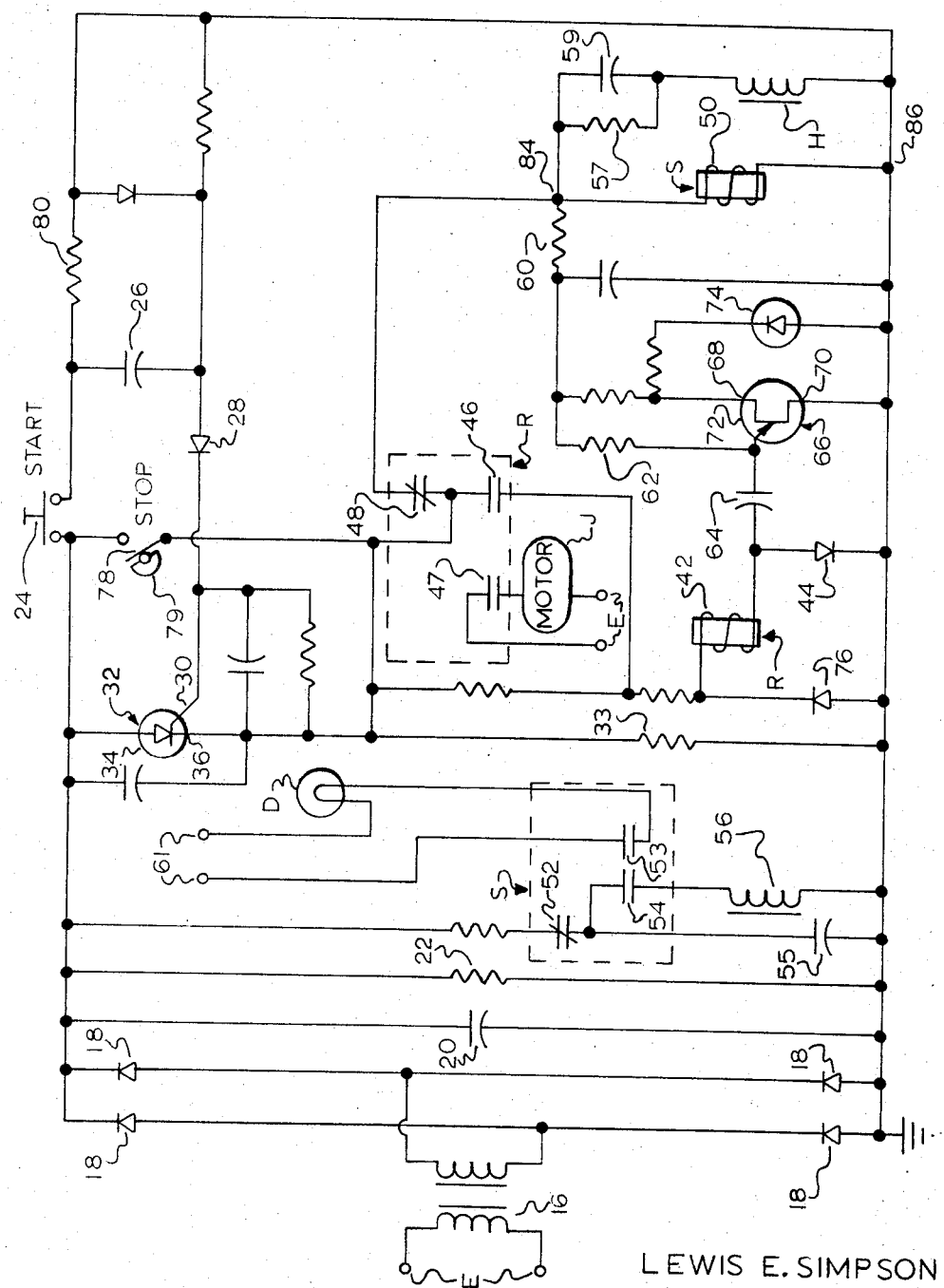
FIG. 2 is a circuit diagram of an illumination control for the photocopy camera of FIG. 1, constructed in accordance with the present invention.

The timing device I is shown in detail in the circuit diagram of FIG. 2. The circuit illustrated comprises components connected so as to energize the shutter solenoid H to open the shutter and to energize the motor J to advance the film strip at the proper time.

The circuit of FIG. 2 will now be described in detail in connection with a preferred embodiment of the invention. The circuit includes a transformer 16 having a primary winding adapted for connection to the power line E, which is typically a 120 volt 60 c.p.s. household power outlet. The secondary winding of the transformer 16 is connected to a full wave bridge rectifier consisting of four diodes 18. A capacitor 20 and bleeder resistor 22 serve to smooth the voltage output and reduce the effects of surge loads, such as those caused by the shutter solenoid H.

A picture taking cycle is initiated by momentarily depressing a push-button switch 24 to briefly close it. Current flows through the switch 24 and pulses through a capacitor 26 (before it can become charged) and a diode 28, to the gate terminal 30 of a silicon controlled rectifier 32. The cathode of the silicon controlled rectifier, or SCR, 32 is connected to the negative side of the full wave rectifier (diodes 18) through a current limiting resistor 33. When current flows through the gate terminal 30, the SCR 32 is transformed to its conducting state (it "breaks down"), and it remains in this state until the current through it drops below its hold-in value.

Current from the SCR then passes through two relays: a first relay R that controls the operation of the shutter solenoid H and film strip advance motor J; and a second relay S that controls the film frame counter K and the energizing of the lamps D to full photographic brilliance.

Current flowing through the SCR 32 first passes through a pair of normally-closed contacts 48 in the first relay R, and then through a winding 50 of the second relay S which can operate three sets of contacts: one set of normally-closed contacts 52 and two sets of normally-open contacts 53 and 54. (In actual practice, a commercially available double-pole, double-throw relay can be used for the first and second relays: Thus, for example, in the second relay one of these would define the set of normally-closed contacts 52 and one set of normally-open contacts 54, and the other pole would define the other set of normally-open contacts 53 and an unconnected set of normally-closed contacts that are not used here.) The flow of current through the relay winding 50 of the second relay S causes an armature of this second relay S to move and open the normally-closed contacts 52 while closing the normally-open contacts 53 and 54. As a result, current for the lamp D passes through the now-closed first set of contacts 53 from a lamp energizing source 61, which may be the power-line voltage source E or preferably a voltage or current controlled source (not shown) that supplies an amount of energy to the lamps D as a function of the reflectivity of the document to be copied. The simultaneous closing of the second set of normally-open contacts 54 allows current from a previously charged capacitor 55 to flow through a counter solenoid 56. When current flows through the solenoid 56, a count is registered on numbered dials which indicate the number of exposures taken on the strip of film being used to make copies of documents.

When this SCR 32 is conducting, current also flows through a speed-enhancing and hold-in current limiting coupling consisting of a resistor 57 and capacitor 59, and through the shutter solenoid H to open the shutter and begin the exposure of the film.

As soon as the SCR 32 begins conducting current, some current also flows through two charging resistors 60 and 62 to charge a timing capacitor 64, which is grounded to the negative side of the full wave rectifier through a diode 44. The timing capacitor 64, together with the charging resistors 60 and 62, serve to determine the period of time during which the solenoid operated shutter F (FIG. 1) will be open. As current from the SCR flows to the timing capacitor 64, the voltage across the capacitor continually increases until a predetermined "switching" voltage is reached. This predetermined switching voltage causes the switching on, or change to a conducting state, of a unijunction switching transistor 66. When the transistor 66 changes to the conducting state, the timing capacitor 64 suddenly discharges and causes the shutter F to close, as will be explained hereinafter.

The unijunction switching transistor 66, which discharges the timing capacitor 64, includes first and second base terminals 68 and 70 and an emitter terminal 72. When a voltage that is applied to the emitter terminal 72 exceeds a certain portion of the voltage applied to the first base terminal 68 (with the second base terminal 70 grounded), the resistance between any one of the three terminals 68, 70 and 72 and the others suddenly falls to nearly zero. A constant voltage is applied between the base terminals 68 and 70 of the unijunction transistor by a zener diode 74. Thus, the voltage required at the emitter terminal 72 to switch on the transistor 66 is constant regardless of line voltage changes.

As the film is being exposed, through the opened shutter, the timing capacitor 64 becomes charged. The full voltage of the timing capacitor 64 is connected across the emitter 72 and second base terminal 70 of the unijunction transistor through the diode 76 and the relay winding 42 of the first relay R. As soon as the required switching voltage is attained, the resistance between the emitter 72 and second base terminal 70 falls to zero. The entire charge on the timing capacitor 64 is then conducted through the winding 42 of the first relay R, through the diode 76, and through the unijunction switching transistor 66. The sudden surge of current through the first relay winding 42 causes an armature of the first relay R to move and open the set of normally-closed contacts 48 while closing the two sets of normally-open contacts 46 and 47. When the first set of normally-open contacts 46 close, current flows through them to the winding 42 of the first relay R, to hold the relay R in its energized state. This opening of the set of normally-closed first relay contacts 48 terminates the flow of current to the shutter solenoid H, thereby closing the shutter F and terminating the exposure.

In addition to closing the shutter F, this opening of the normally-closed contacts 48 terminates the flow of current through the winding 50 of the second relay S. This causes the lamp current supply contacts 53 of the second relay to open, terminating the flow of full brilliancy lamp current to the lamps. It also causes the second set of normally-open relay contacts 54 to open, and the set of normally-closed contacts 52 to close, thereby enabling the frame counter current supply capacitor 55 to be recharged and be ready for the next exposure.

The actuation of the first relay R after the exposure period, by the surge of current through the first relay winding 42, also closes the second set of normally-open contacts 47. The closing of these contacts 47 allows current from a supply source such as line voltage to flow through the film winding motor J. This film winding motor J also turns a cam 79 operating a switch 78 as it winds the film. When the cam 79 has turned sufficiently to close the cam operated switch 78, the switch shorts out the SCR 32, reducing its current to below its hold-in value. The SCR 32 thereupon becomes non-conducting and current then flows through the cam-operated switch 78 and winding 42 of the first relay R. When the cam 79 has turned sufficiently to advance the film to the next frame, the cam-operated switch 78 opens, causing the first relay R to return to its unenergized state wherein the normally closed contacts 48 are closed while the normally open contacts 46 and 47 are open, whereupon the motor J ceases to turn.

If the starting switch 24 has been kept closed throughout the exposure and film winding cycle, and also for a period of time thereafter, a new exposure will not occur automatically. The reason for this is that even though the starting switch 24 is held closed, the capacitor 26 has already been charged, and therefore does not pass any more current. This construction is provided to guard against the production of two copies by unknowledgeable operators of the copying machine, who may hold down the starting switch 24 during the entire copying cycle and for a short period of time thereafter. When the starting switch 24 is opened, the capacitor 26 discharges through a discharging resistor 80 so that a new exposure cycle can be initiated.

While the illumination lamps D may be connected directly across the power line to provide illumination at all times during connection of the photocopy camera to the power line, certain advantages are obtained by connecting the lamp in a manner similar to that shown in the circuit of FIG. 2, where the lamp D is fully energized only when the shutter H is opened and a film exposure is being made. Accordingly, a minimum of power is consumed and minimum of heat is generated by the lamps. As a result, the copying machine can be left on for long periods, ready to be activated by merely pressing the pushbutton starting switch 24, without overheating the machine and without consuming excessive power.

If the voltage across the power line terminals, to which the transformer 16 is connected, increases during the exposure period, more current will pass through the lamp D. As a result, the lamp glows brighter and a shorter exposure period is required.

The timing circuit thereupon provides a shorter illumination period by charging the capacitor 64 at a faster rate. The exposure period is determined by the switching voltage required to switch on the unijunction transistor 66 and by the period of time required to charge the timing capacitor 64 to that voltage. Inasmuch as the switching voltage depends only on the voltage between the bases 68 and 70 of the transistor, and this voltage is determined by the breakdown voltage of the zener diode 74, the unijunction transistor switching voltage is independent of variations in power line voltage. The time required to charge the timing capacitor 64 to the switching voltage, however, is a direct function of the power line voltage. If the power line voltage, and therefore the light intensity of the lamp, increases, the timing capacitor will charge at a more rapid rate and fire the transistor 66 sooner. The total light produced by the lamp during the exposure is the integral with time of the lamp intensity, and the voltage across the capacitor is the integral with time of the power line voltage. Thus, momentary voltage surges or drops affect the total light output in the same general manner as they affect the time required to complete the exposure cycle, and the effects of voltage surges, no matter how abrupt, are at least partially compensated.

When the voltage across an electric lamp increases, the light intensity generally increases more than proportionally. The rate of voltage buildup of the timing capacitor can be made to increase at a rate more than proportional to the rate of increase in the power line voltage by the proper choice of capacitor 64, charging resistor 62, unijunction transistor 66, and zener diode reference 74. FIGS. 3 and 4 present graphs of the voltage across the timing capacitor 64 of the circuit of FIG. 2 as a function of time, $t$, where the charging voltage $V_1$ or $V_2$, respectively, is the voltage across the resistors 60 and 62 and the timing capacitor 64, or in other words, across reference terminals 84 and 86. In FIG. 3, the charging voltage $V_1$ is considerably higher than the switching voltage $V_s$ required to switch on the unijunction transistor, and the charging curve 90 is almost linear. If the charging voltage $V_1$ increases by an amount $dV_1$, the new charging curve is as shown at 92, and the decrease in time $dT_1$ required to reach switching voltage $V_s$ is approximately proportional to the increase $dV_1$ in charging voltage.

In FIG. 4, the charging voltage $V_2$ is not much higher than the switching voltage $V_s$ and the curve clearly displays its exponential characteristics. If the charging voltage $V_2$ increases by an amount $dV_2$, the new charging curve 96 reaches the switching voltage $V_s$ in a time period which is much shorter, by a period $dT_2$. The decrease in time, $dT_2$, is much greater than the proportional increase in voltage. Thus, by choosing a zener diode 74 of high breakdown voltage and a unijunction transistor whose emitter 72 is near the first base 68 so that a high emitter switching voltage is obtained, the degree of non-proportionality between power line voltage increase and timing period decrease can be adjusted. The degree of non-proportionality may be small, but it helps to compensate for the more-than-proportional increase in brightness of the lamps with power line voltage increase. Generally, the non-proportionality is very apparent for charging voltages of less than about one and one-half times the switching voltage.

From the foregoing it is apparent that the invention provides improved illumination timing control for photocopy equipment, and which compensates both for relatively sudden and for appreciably slower changes in power line voltage. While the invention has been described with respect to a copying machine and timing circuit of a specific design, it will be appreciated that other forms of reproduction equipment controls and of illumination timing controls can be constructed using the features of the invention.

What is claimed is:

1. An exposure control arrangement for an electrically powered illuminating source comprising:

capacitor means connectable to a charging voltage substantially proportional to the voltage supplied to said illuminating source;

switching means connected to said capacitor for discharging said capacitor when the voltage thereacross reaches a predetermined switching value; and exposure control means connected to said switching means and to said capacitor to initiate an exposure at approximately the same time that said capacitor means begins to charge, and for terminating the exposure at approximately the same time that said capacitor is discharged, said switching means comprising a unijunction transistor means having two bases and an emitter, and further including a zener diode means connected across said bases, and wherein said capacitor is connected across said emitter and one of said bases, whereby the exposure period decreases or increases with the increase or decrease, respectively, of voltage across said illuminating source.

2. A photocamera exposure control circuit of the kind including a relay-controlled electrically energized illuminating apparatus comprising:

current supply means for energizing a photocamera light source;

relay means connected to said current supply means for controlling the energizing of said illuminating apparatus;

electrically operated timing circuit means connected to said relay means for activating said relay means;

said timing circuit means including voltage responsive means constructed to vary the timing period of said timing circuit in accordance with the input voltage to said timing circuit means so as to provide an increased timing period for decreased voltage inputs thereto, said voltage responsive means connectable to an electrical source having a voltage substantially proportional to the voltage supplied to said illuminating source;

said timing circuit means further including a charging means also connectable to said electrical source so as to receive a voltage substantially proportional to the voltage applied to said illuminating apparatus, and to build up a voltage at a rate which is a function of the voltage of said electrical source; and triggering means responsive to a predetermined voltage for enabling the energizing and deenergizing of said relay means upon the receipt of said predetermined voltage.

3. An exposure control circuit for a photocopy camera having an integral electrically energized illuminating means, comprising:

relay means connected to said illuminating means for enabling the energizing of said illuminating means, said relay means including a relay winding having two terminals for operating said relay to terminate the energization of said illuminating means when said relay winding is energized;

a capacitor having two terminals with one capacitor terminal connected to the first of said relay winding terminals;

unijunction transistor means having two base terminals and an emitter terminal for conducting current when a predetermined input voltage is applied between said emitter terminal and one of said base terminals, said emitter terminal and one of said base terminals connected between the second of said relay winding terminals and the second of said capacitor terminals; and zener diode means for maintaining a constant voltage, and connected across said base terminals of said unijunction transistor means.

4. A copying control for a photocopying machine, comprising:

silicon controlled rectifier means including anode means, cathode means and gate means for suddenly conducting current when a small current is applied to said gate means at least momentarily;

starting switch means for applying said small current to said gate;

exposure control means connected to said silicon controlled rectifier means for exposing light sensitive material during the period when said exposure means receives current from said silicon controlled rectifier means; and timing means connected to said silicon controlled rectifier means for causing the shorting of said anode and cathode means thereof after a predetermined period of time.

5. A photocopying machine control apparatus, comprising:

silicon controlled rectifier means including anode means, cathode means, and gate means for suddenly conducting current when a small current is applied to said gate means at least momentarily;

starting switch means for applying said small current to said gate;

exposure control means connected to said silicon controlled rectifier means for exposing light sensitive material during the period when said exposure means receives current from said silicon controlled rectifier means;

timing means connected to said silicon controlled rectifier means for causing the shorting of said anode and cathode means thereof after a predetermined period of time;

relay means including a control winding, a set of normally-closed contacts, and a set of normally-open contacts, said set of normally-closed contacts connected between said silicon controlled rectifier means and said timing means;

said timing means being constructed for the production of a surge of current through said control winding of said relay means at the end of an exposure period, to operate said relay so that said normally-closed contacts are opened and said normally-open contacts are closed;

said normally-open contacts connected between said silicon controlled rectifier means and said relay means for enabling the continued energizing of said relay to maintain, in a closed condition, said normally-open contacts;

motor means connected for energization when said normally-open contacts are closed; and switch means connectable across said anode and cathode of said silicon-controlled rectifier means for shorting it, said switch means operable by said motor means so as to short out said silicon controlled rectifier means after a predetermined movement of said motor means.

6. A copying machine as defined in claim 5 wherein: said timing means comprises a unijunction transistor means for conducting current when a predetermined switching voltage is connected thereto, and a capacitor for charging to said switching voltage; and conductor means connected between said capacitor, said unijunction transistor means, and said relay means, for discharging said capacitor through said relay means so as to energize said relay means at the end of said timing period.

7. A copying machine as defined in claim 6 including:
zener diode means connected to said unijunction transistor means for providing a constant predetermined switching voltage.

8. A copying machine as defined in claim 5 wherein:
said exposure control means includes a shutter opening control means and an electric lamp current supply control means connected to said silicon controlled rectifier means, whereby heat from the illuminating source is produced for a minimum period of time.

9. A photocopying machine control apparatus, comprising:
silicon controlled rectifier means including anode means, cathode means, and gate means for suddenly conducting current when a small current is applied to said gate means at least momentarily;
starting switch means for applying said small current to said gate;
exposure control means connected to said silicon controlled rectifier means for exposing light sensitive material during the period when said exposure means receives current from said silicon controlled rectifier means;
timing means connected to said silicon controlled rectifier means for causing the shorting of said anode and cathode means thereof after a predetermined period of time;
relay means including a control winding, a set of normally-closed contacts, and a set of normally-open contacts, said set of normally-closed contacts connected between said silicon controlled rectifier means and said timing means;
said timing means being constructed for the production of a surge of current through said control winding of said relay means at the end of an exposure period, to operate said relay so that said normally-closed contacts are opened and said normally-open contacts are closed;
said normally-open contacts connected between said silicon controlled rectifier means and said relay means for enabling the continued energizing of said relay to maintain, in a closed condition, said normally-open contacts;
motor means connected for energization when said normally-open contacts are closed;
switch means connectable across said anode and cathode of said silicon-controlled rectifier means for shorting it, said switch means operable by said motor means so as to short out said silicon controlled rectifier means after a predetermined movement of said motor means; and
motor shut-off means connected to said relay means and to said switch means to terminate operation of said motor means a predetermined period of time after the end of an exposure period.

References Cited
UNITED STATES PATENTS 3,262,356   7/1966   Forbes _____ 88—24

NORTON ANSHER, *Primary Examiner.*

R. A. WINTERCORN, *Examiner.*